United States Patent
Drmic

(10) Patent No.: US 8,622,696 B2
(45) Date of Patent: Jan. 7, 2014

(54) STEAM TURBINE ROTOR

(75) Inventor: Jozo Drmic, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 511 days.

(21) Appl. No.: 12/959,833

(22) Filed: Dec. 3, 2010

(65) Prior Publication Data
US 2011/0135480 A1 Jun. 9, 2011

(30) Foreign Application Priority Data
Dec. 8, 2009 (EP) ..................................... 09178341

(51) Int. Cl.
*F01D 5/02* (2006.01)

(52) U.S. Cl.
USPC ................. 415/216.1; 29/889.2; 29/525.02; 29/525.11

(58) Field of Classification Search
USPC ..................................................... 415/216.1
See application file for complete search history.

(56) References Cited

U.S. PATENT DOCUMENTS

| | | | | |
|---|---|---|---|---|
| 1,399,816 | A * | 12/1921 | Spiess | 416/248 |
| 2,049,289 | A * | 7/1936 | Burns et al. | 464/21 |
| 2,195,938 | A * | 4/1940 | Reed | 415/125 |
| 3,240,513 | A * | 3/1966 | Turzillo | 285/90 |
| 3,266,827 | A | 8/1966 | Whicker | |
| 3,749,516 | A | 7/1973 | Samurin et al. | |
| 3,846,044 | A | 11/1974 | Shank | |
| 2009/0185895 | A1 * | 7/2009 | Wieghardt | 415/104 |

FOREIGN PATENT DOCUMENTS

| | | |
|---|---|---|
| DE | 343462 C | 11/1921 |
| DE | 1425321 A1 | 10/1968 |
| DE | 2 248 929 | 4/1973 |
| EP | 0902163 B1 | 4/2003 |
| EP | 1378629 A1 | 1/2004 |
| EP | 1780376 A1 | 5/2004 |
| GB | 723883 | 2/1955 |

OTHER PUBLICATIONS

European Search Report dated Feb. 8, 2010, European Application No. 09178341.5.
Search Report dated Feb. 27, 2012, issued in corresponding German Patent Application No. 10 2010 052 118.3 (5 pages).

* cited by examiner

*Primary Examiner* — Nathaniel Wiehe
*Assistant Examiner* — Jeffrey A Brownson
(74) *Attorney, Agent, or Firm* — Buchanan Ingersoll & Rooney PC

(57) ABSTRACT

A joined rotor that includes a primary join and a locking device and a method for joining thereof is disclosed. The primary join includes a threaded boss that is inserted in a tapped cavity formed in an adjacent rotor section. The primary join is locked, so as to prevent unscrewing, by at least one locking member that is located partially in both first and second rotor sections. This arrangement enables the join to be locked at a desired torque point.

12 Claims, 2 Drawing Sheets

STEAM TURBINE ROTOR

RELATED APPLICATION

This application claims priority under 35 U.S.C. §119 to European Patent Application No. 09178341.5 filed in Europe on Dec. 8, 2009, the entire content of which is hereby incorporated by reference in its entirety.

FIELD

The disclosure relates to sectioned high temperature steam turbine rotors such as those suitable for operation at temperatures greater than 600° C. The disclosure also relates to rotor section joining systems and locking systems that can lock the joining systems.

BACKGROUND INFORMATION

A known steam turbine rotor can be exposed to a variety of conditions along its axial length. As no one material is optimum for the differing conditions, it is desirable to assemble the rotor from sections each made of a different material. In order to form a complete rotor from the sections, the sections can be joined.

One method of joining rotor sections is by welding. However, some materials are difficult or impossible to weld. In such cases either different materials can be selected or alternate joining methods provided. One alternative joining method involves the use of bolts. European patent EP 1378629 A1 discloses a method involving individually bolting together forged sections of a high-temperature steam turbine. As the bolts are exposed to the full stress of the join, a significant number of bolts are required to maintain join integrity.

Another method is disclosed in DE 343462 C. The method involves joining rotor sections by screwing a threaded boss, which extends from one section, into a tapped cavity of an adjacent section. In order to prevent the joined sections from separating axially on account of varying bending stresses and vibration, a locking member is passed transversely through both the boss and adjacent disk so as to extend across the completed diameter of the rotor. In one arrangement, two members are provided. These members are arranged 90° from each other and perpendicular to the rotor axis.

When this method is applied to large steam turbines, due to rotor size and the length specification of the locking members, pre-drilling of cavities for the locking members through the rotors can be carried out during manufacture of the rotor sections. As it is difficult to predetermine the optimum location for the locking cavities before making the join, there may be undertorquing of the join. As a result, the locking members should be designed to withstand some of the specified joining force, increasing their size and further complicating the design.

SUMMARY

A method is disclosed for locking together first and second axially adjacent rotor sections of a steam turbine. A first rotor section includes a threaded boss that axially extends from, and is concentric, with an axis of rotation of the first rotor section and a second rotor section includes a tapped cavity that is configured to receive the threaded boss. The threaded boss and tapped cavity are components of a primary join. The method includes a) forming a first locking cavity, non-concentrically with the axis of rotation of the first rotor section, the first locking cavity being provided for receiving a locking member therethrough and being formed through one of the rotor sections to a rotor section surface that at least partially contacts a rotor section surface of the other rotor section when the primary join is formed, b) forming the primary join by joining, either before or after a) the threaded boss and tapped cavity, together, c) forming a second locking cavity from the first locking cavity, after a) and b), that partially extends into the other rotor section so as to terminate in the other rotor section, and d) inserting a locking member, after step c), into the first locking cavity such that the locking member is located partially in both the first locking cavity and second locking cavity to form a locking system to maintain the primary joining system.

An axial rotor for a steam turbine is disclosed, including a first rotor section having an end face, and a threaded boss that extends axially from the end face and is concentric with the first rotor section; a second rotor section, located axially adjacent the first rotor section, and including: a tapped cavity for receiving the threaded boss so as to form a primary joining system between the first and second rotor sections; a locking system, to maintain the primary joining system, including, first and second locking cavities, extending and aligned in the first rotor section and second rotor section respectively, the cavities being non-concentric to a rotor axis forming a locking passage; and a locking member for extending in the locking passage, for maintaining alignment of the first and second cavities. The locking passage extends through one of the rotor sections and partially into the other rotor section so as to terminate in the other rotor section.

BRIEF DESCRIPTION OF THE DRAWINGS

By way of example, exemplary embodiments of the disclosure are described more fully hereinafter with reference to the accompanying drawings, in which.

DETAILED DESCRIPTION

Figure 1:
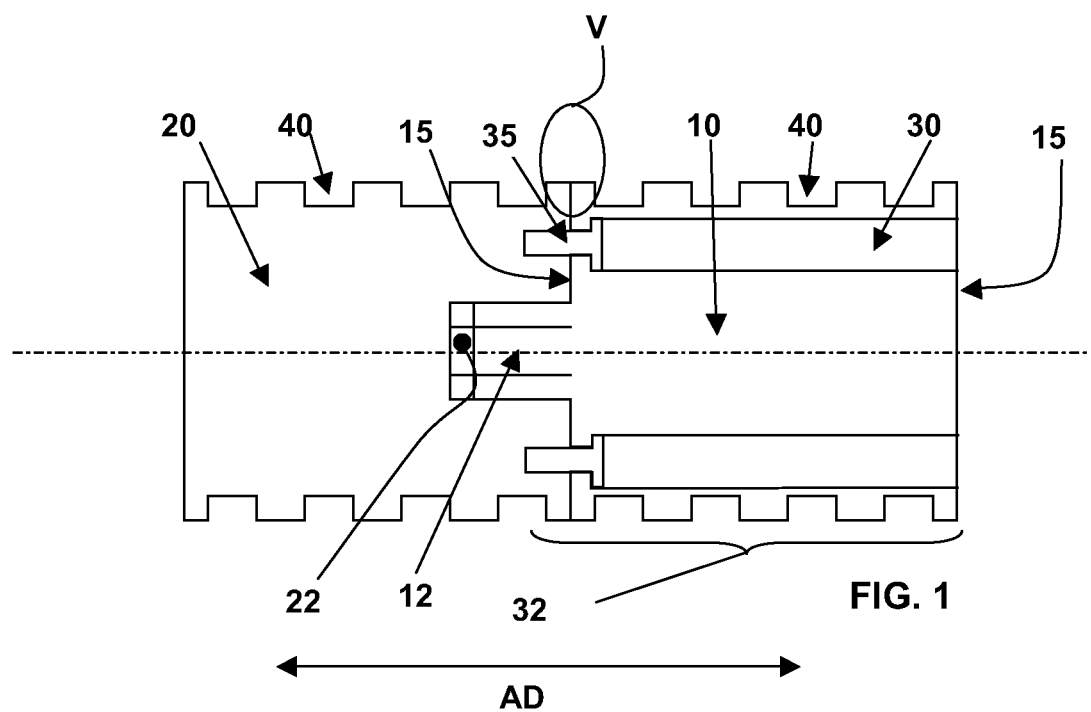
FIG. 1 is a schematic view of an exemplary embodiment of rotor sections of a high temperature steam turbine rotor configured with a primary joining system and locking system.

Exemplary embodiments of the disclosure provide a rotor with, and a method for, locking rotor sections of a high temperature steam turbine that can be joined by a screw.

An exemplary embodiment of the disclosure provides a method to lock together first and second axially adjacent rotor sections of a steam turbine which in an exemplary embodiment can operate at greater than 600° C. wherein the rotor sections can be joined together by a primary joining system. The primary joining system can include a threaded boss that axially extends from and is concentric with the first rotor section, as well as a tapped cavity in the second rotor section that can be configured to screwingly receive the boss. The method includes forming a first locking cavity that is non-concentric with an axis of rotation of the rotor for receiving a locking member therethrough. The first locking cavity can be formed through one of the rotor sections to a rotor section surface configured to at least partially contact a rotor section surface of an other rotor section when the two rotor sections are joined. The rotor sections can be screwed together either before or after the first locking cavity is formed by the primary joining system. The rotor sections together can form a second locking cavity from the first locking cavity, that only partially extends into the other rotor section and then a locking member can be inserted into the first locking cavity such that the locking member can be located partially in both the first locking cavity and second locking cavity. This forms a locking system that can maintain the primary joining system.

As the second locking cavity only partially extends in a rotor section, it can be relatively easily formed and so can be formed after the making the primary join. This enables the rotor sections to be locked at a desired torque point.

An exemplary embodiment provides three first and second locking cavities, in which three locking members are inserted. This arrangement can provide the ability to balance the joined rotor sections.

An exemplary embodiment provides adjacently joined rotor sections, joined by the described method.

Exemplary embodiments of the present disclosure are now described with reference to the drawings, wherein like reference numerals are used to refer to like elements throughout. In the following description, for purposes of explanation, numerous specific details are set forth in order to provide a thorough understanding of the disclosure. It may be evident, however, that the disclosure may be practiced without these specific details. In other instances, well-known structures, devices or features are shown in simplified form in order to facilitate description of the disclosure.

FIG. 1 shows two rotor sections 10,20 of a multi-section rotor that are suitable for a steam turbine. Shown are first 10 and second 20 rotor sections joined together by a primary joining system so as to share a common axis of rotation. Throughout this specification, a "primary joining" is defined as a join designed, using known methods, to provide the required joining strength. As a result, additional joining means are not required to provide additional join strength but may be desired for other purposes.

In an exemplary embodiment, the primary joining system includes a threaded boss 12 that extends axially from an end face 15 of a first rotor section 10 and has an axis concentric with the rotational axis of the rotor sections 10,20.

A second rotor section 20, disposed axially adjacent the first rotor section 10, includes a corresponding tapped cavity 22 in which the threaded boss 12 is screwingly received. The receiving of the threaded boss 12 into the tapped cavity 22 forms the primary join. Exemplary embodiments of primary joins are shown in FIGS. 1 and 3.

To prevent loosening or unscrewing of the primary join system, due to, for example, thermal cycling of the rotor or due to load variation, an exemplary embodiment provides a locking system. A purpose of the locking system is to maintain the position of the primary join system without contributing to the joining force. In one exemplary embodiment, shown in FIG. 1, the locking system includes a first locking cavity 30 that extends through the first rotor section 10 and a second locking cavity 30 that extends partially into the second rotor section 20. "Through" in this specification can be between two surfaces of a rotor section 10,20. For example the locking cavity 30 extending between two end faces 15 of a rotor section 10 shown in FIG. 1 and the locking cavity 30 extending between an outer surface of a rotor section 20 to the tapped cavity 22 in FIG. 3 each show examples of a locking cavity 30 extending "through" a rotor section 10,20. In this way "through" is differentiated from a "partially into" extension in which the extension is from only one surface and ends internally at a blank within the rotor section 10,20.

Figure 2:
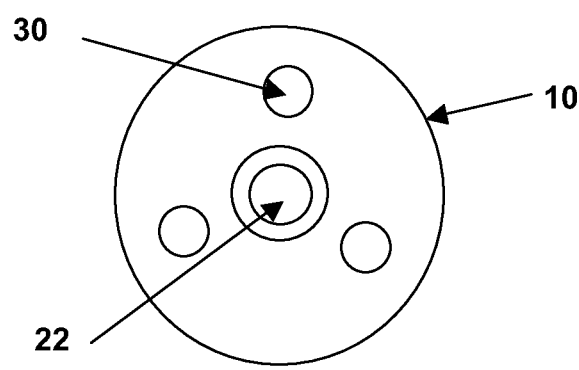
FIG. 2 is schematic end view of one of the rotor sections of FIG. 1.

The non-concentric location of the locking cavities, as shown in FIGS. 1 and 2, enables an inserted locking member 35 to lock the rotor sections 10,20. The insertion is such that the locking member 35 extends at least partially into both locking cavities 30. This can occur when the locking cavities 30 are aligned by the relative rotational positioning of the first and second section 10, 20 so that they form a continuous locking passage 32. The locking member 35 can be a bolt, pin or other suitable member. In this way, the locking system can prevent the unscrewing of the primary joining means. In an exemplary embodiment, the locking cavities 30 can be inclined from the rotational axis of the rotor sections 10,20.

Figure 3:
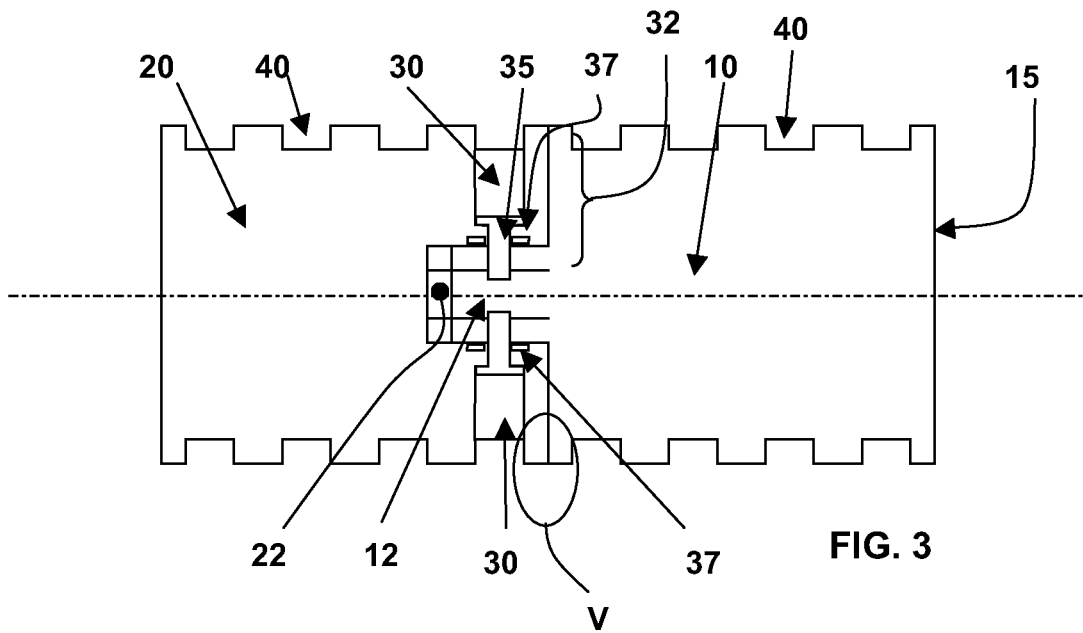
FIG. 3 is schematic view of rotor sections joined by the same primary joining system as FIG. 1 and an exemplary embodiment of a locking system.

In an exemplary embodiment, a radial spacer 37 with a hole, a shown in FIG. 3, is located between the surfaces of the first 10 and second 20 rotor sections such that the a locking member 35 passes through the hole. The use of a radial spacer 37 is not limited to the embodiment shown in FIG. 3 and could also be used in conjunction with the embodiment shown in FIG. 1 or other conceivable embodiments. Alternatively, the embodiment shown in FIG. 3 could be practised without this feature. For arrangements where the thermal expansion coefficient of the first 10 and second 20 sections is different, the radial spacer 37 provides a means to minimise relaxation of the locking member 35 in the locking passage 32 during temperature changes, for example during start-up or shut-down of the turbine and so limits the unfastening or unscrewing potential of the locking member 35.

FIG. 3 further shows an exemplary embodiment in which one of the locking cavities 30 extends only partially into the threaded boss 12 of the first rotor section 10 and through the second rotor section 20 from an outer surface to the tapped cavity 22. The alignment of the locking cavities 30, for example by the relative rotational position of the first and second rotor sections 10,20, can form a locking passage 32 in which a locking member 35 can be inserted, thus providing the same locking functionality as described in relation to FIG. 1.

In an exemplary embodiment, the outer surface from which the locking cavities 30 extend from in the second rotor section 20, can be an inner surface of a blade carrier slot 40, as shown in FIG. 3. In operation, a blade root can cover this surface and so by this means, aerodynamic losses associated with the locking cavity 30 can be avoided. Depending on the location of the blade carrier slot 40, it may be desirable for the locking passage 32 to be angled away from and perpendicular to the rotor rotational axis. This is in part enabled by the fact that the second locking cavity 30 extends only partially into the first rotor section 10 and so the required length of the locking member 35 can be reduced by minimizing geometric constraints of placing the locking member 35 in the blade carrier slot 40 during insertion into the locking cavity 30.

Figure 4:
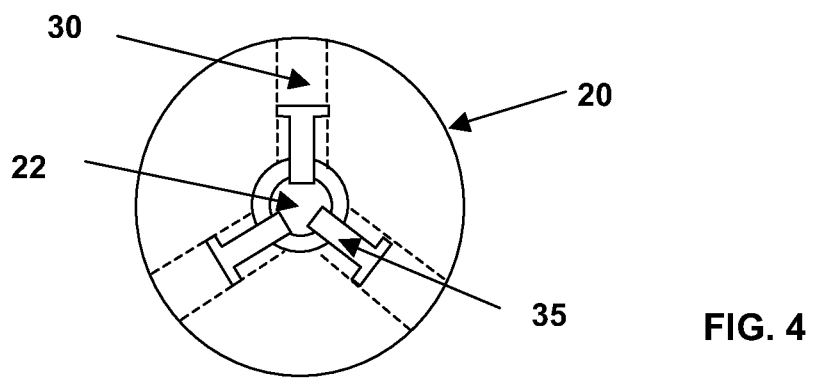
FIG. 4 is schematic end view of one of the rotor sections of FIG. 3.

In a further exemplary embodiment, three pairs of locking cavities 30 can form three corresponding locking passages 32. Such an arrangement is shown in FIGS. 2 and 4. It can be desirable to have only three locking passages 32 as this arrangement makes it easier to balance the rotor. However, a different number of locking passages 32 can be provided. The balancing can be further enhanced if, the locking cavities 30 are evenly distributed circumferentially around the rotor sections 10,20 as further shown in FIG. 2 and FIG. 4.

Figure 5:
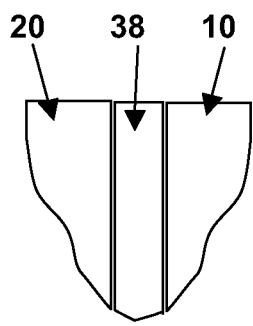
FIG. 5 is an expanded view part V of FIG. 1 or 3 showing an axial spacer.

FIG. 5, which is an expanded view of the join region of two adjacent rotor sections 10,20, shows the location of an axial spacer 38 between the two rotor sections 10,20. The axial spacer 38, in one exemplary embodiment, can include a single piece, while in another exemplary embodiment, the axial spacer 38 can include more than one piece, two half rings for example. The axial spacer 38, which has a thickness in the axial direction AD, can be made of a material with thermal expansion properties different from those of the rotor sections 10,20. A purpose of the space is to ensure consistent screw force, in the axial direction AD, of the primary joining system independent of thermal expansion and/or contraction of the adjacent rotor sections 10,20. In an exemplary embodiment where, for example, thermal expansion may result in the over-tightening of the primary join, the axial spacer 38 can have a lower thermal expansion coefficient than the rotor section material. In an exemplary embodiment where, for example, thermal contraction may result in the over-tightening of the primary join, the axial spacer 38 can have a higher thermal expansion coefficient than the rotor section material. In each case, in order to ensure the correct function of the axial spacer 38, the axial spacer 38 material and radial thickness can be selected in consideration of the configuration of the primary join, the material of the rotor sections 10, 20 and the temperature range the rotor sections 10,20 may be exposed to.

An exemplary method provides a method for joining together two axially adjacent rotor sections 10,20 of a steam turbine configured for operation at greater than 600° C. Such section are for example shown in FIGS. 1 to 5. The rotor sections 10,20 have a primary joining system including in a first rotor section 10 a threaded boss 12 that axially extends from and concentric with the axis of rotation of the rotor of one of the rotor sections 10,20 and in a second rotor section 20 a tapped cavity 22. The tapped cavity is configured to screwingly receive the threaded boss 12. The method includes forming a first locking cavity 30 non-concentrically with the axis of rotation of the rotor that is adapted to receive a locking member 35 therethrough. The cavity 30 is formed through one of the rotor sections 10,20 to a rotor section surface that can be configured to at least partially contact a rotor section surface of the other rotor section 10,20 when the rotor sections 10,20 are joined. Such a surface can be, for example, a rotor end surface 15, shown in FIG. 1 or the inner surface of the tapped cavity 22, as shown in FIG. 3. As there is no special alignment requirement that requires the rotor sections 10,20 to be joined before the forming of the first locking cavity 30, the forming can occur either before or after the joining.

Either before or after the step of forming the first locking cavity 30, the two rotor sections 10,20 can be joined together by the primary joining system. In an exemplary embodiment, in order to reduce relaxation of the primary joining system after joining and so minimise loosening of the primary join, the primary join can be formed and disassembled at least two times before the final join is made.

Once both the described joining and forming steps of the first locking cavity 30 are completed, a second locking cavity 30 can be formed from the first locking cavity 30, for example, by passing a drill bit through the first locking cavity 30. This can ensure alignment of the first and second locking cavities 30. In an exemplary embodiment, the second locking cavity 30 can be formed so as to extend partially into the other rotor section 10,20 so as to terminate in the other rotor section 10,20. As the second locking cavity 30 does not pass through any of the rotor sections 10,20, the second locking cavity 30 can be formed relatively quickly and easily and so overcome the practical difficulties of forming the partial cavity 30 after the primary join is made. Forming the second locking cavity 30 at this point enables the rotor sections 10,20 to be locked together at the desired torque point of the primary join.

The last step can include inserting a locking member 35 into the locking cavities 30 such that the locking member 35 can be partially located in both the first locking cavity 20 and the second locking cavity 30. In this way the locking member 35 can prevent the unscrewing of the primary joining system. In an exemplary embodiment, the insertion of a locking member can include insertion through a radial spacer 37 with a hole that is located between the first 10 and second 20 rotor sections In an exemplary embodiment that includes an axial spacer 38, the method can include fitting of the rotor space before the making of the primary join axially between the first 10 and second 20 rotor sections.

The disclosure can be practised as part of a rotor retrofit process. When this is the case, various components that form part of the disclosure may be created by modification of existing parts. Therefore, within the context of this disclosure the provision of the features of the disclosure includes modification and original creation.

Although the disclosure has been herein shown and described in what is conceived to be the most practical exemplary embodiment, it will be appreciated by those having ordinary skill in the art that the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

Thus, it will be appreciated by those having ordinary skill in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for locking together first and second axially adjacent rotor sections of a steam turbine, including a first rotor section having a threaded boss that axially extends from and is concentric with an axis of rotation of the first rotor section and a second rotor section having a tapped cavity that is configured to screwingly receive the threaded boss, wherein the threaded boss and tapped cavity comprise components of a primary join, the method comprising:
  a) forming a first locking cavity, non-concentrically with the axis of rotation of the first rotor section, the first locking cavity being provided for receiving a locking member therethrough, the first locking cavity being formed through one of the rotor sections to a rotor section surface that at least partially contacts a rotor section surface of the other rotor section when the primary join is formed;
  b) forming the primary join by joining, either before or after a) the threaded boss and tapped cavity, together;
  c) forming a second locking cavity from the first locking cavity, after a) and b), that partially extends into the other rotor section so as to terminate in the other rotor section; and
  d) inserting a locking member, after step c), into the first locking cavity such that the locking member is located partially in both the first locking cavity and second locking cavity to form a locking system to maintain the primary joining system, and
  wherein b) includes forming and disassembling the primary join at least two times before the final join is made.

2. The method of claim 1, wherein:
in a) three first locking cavities are formed;
in c) three second locking cavities are formed; and
in d) three locking members are inserted.

3. The method of claim 1, wherein b) includes the fitting of an axial spacer axially between the first and second rotor sections while forming the primary join.

4. The method of claim 1, wherein d) includes placing a radial spacer piece with a hole between surfaces of the first and second rotor sections such that the locking member passes through the radial spacer hole.

5. An axial rotor for a steam turbine, comprising:
a first rotor section including an end face, and a threaded boss that extends axially from the end face and is concentric with the first rotor section;
a second rotor section, located axially adjacent the first rotor section, including:
  a tapped cavity for receiving the threaded boss so as to form a primary joining system between the first and second rotor sections;
  a locking system, to maintain the primary joining system, comprising:
    first and second locking cavities, extending and aligned in the first rotor section and second rotor section respectively, the cavities being non-concentric to a rotor axis forming a locking passage, wherein the first locking cavity extends only partially into the first rotor section; and
    a locking member for extending in the locking passage, for maintaining alignment of the first and second cavities,
    the locking passage extending through one of the rotor sections and partially into the other rotor section so as to terminate in the other rotor section; and
  a blade carrier slot in the second rotor section, for receiving a blade root wherein the second locking cavity extends from the blade carrier slot.

6. The rotor of claim 5, wherein:
the second locking cavity extends from a surface of the tapped cavity; and
the first locking cavity extends into the threaded boss.

7. The rotor of claim 5, wherein the second locking cavity extends only partially into the second rotor section.

8. The rotor of claim 7, wherein the first locking cavity extends through the first rotor section.

9. The rotor of claim 5, wherein the rotor, comprises:
three first locking cavities and three, second locking cavities.

10. The rotor of claim 5 wherein the locking cavities are angled away from and perpendicular to the rotor rotational axis.

11. The rotor of claim 5, comprising:
a radial spacer with a hole located between the first and second rotor sections such that the locking member passes through the hole of the radial spacer.

12. The rotor of claim 5, comprising:
an axial spacer located axially between the first and second rotor section.

* * * * *